United States Patent
Fujiyama et al.

(10) Patent No.: US 8,471,919 B2
(45) Date of Patent: Jun. 25, 2013

(54) IMAGE PICKUP APPARATUS, METHOD, AND PROGRAM WITH IMPROVED MOVING AND STILL IMAGE HANDLING

(75) Inventors: Michihiro Fujiyama, Kyotanabe (JP); Masaaki Ueda, Katano (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 262 days.

(21) Appl. No.: 12/856,869

(22) Filed: Aug. 16, 2010

(65) Prior Publication Data

US 2011/0050931 A1    Mar. 3, 2011

(30) Foreign Application Priority Data

Aug. 27, 2009  (JP) ................. 2009-197243

(51) Int. Cl.
*H04N 5/225* (2006.01)
*H04N 5/222* (2006.01)
*H04N 5/77* (2006.01)

(52) U.S. Cl.
USPC ............. 348/220.1; 348/333.02; 386/224

(58) Field of Classification Search
USPC ............. 348/220.1, 901, 333.02, 333.04, 348/333.12; 386/120, 224–225
See application file for complete search history.

(56) References Cited

U.S. PATENT DOCUMENTS

| | | | |
|---|---|---|---|
| 5,634,162 A | 5/1997 | Suzuki | |
| 7,411,623 B2 * | 8/2008 | Shibutani | 348/333.02 |
| 2009/0115861 A1 * | 5/2009 | Mochizuki | 348/220.1 |

FOREIGN PATENT DOCUMENTS

| | | |
|---|---|---|
| JP | 08-140026 A | 5/1996 |
| JP | 2004-015450 A | 1/2004 |

* cited by examiner

*Primary Examiner* — Aung S Moe
*Assistant Examiner* — Mekonnen Dagnew
(74) *Attorney, Agent, or Firm* — Westerman, Hattori, Daniels & Adrian, LLP

(57) ABSTRACT

A video camera includes an image sensor for picking up an image of a subject and outputting a still image or a moving image, an operation accepting portion for accepting an operation by the user, and an image pickup control portion for, in response to the operation accepting portion accepting an operation of giving an instruction to pick up a moving image, controlling the image sensor to pick up an image under a predetermined condition for still images and thereafter allowing the image sensor to pick up an image under a predetermined condition for moving images, and for, in response to the operation accepting portion accepting an operation of giving an instruction to pick up a still image, controlling the image sensor to pick up an image under a predetermined condition for still images.

14 Claims, 6 Drawing Sheets

IMAGE PICKUP APPARATUS, METHOD, AND PROGRAM WITH IMPROVED MOVING AND STILL IMAGE HANDLING

This application is based on Japanese Patent Application No. 2009-197243 filed with Japan Patent Office on Aug. 27, 2009, the entire content of which is hereby incorporated by reference.

BACKGROUND OF THE INVENTION

1. Field of the Invention

The present invention relates to an image pickup apparatus, an image pickup method, and an image pickup program, and more particularly to an image pickup apparatus for picking up still images or moving images in accordance with user's instructions, and an image pickup method and an image pickup program executed in the image pickup apparatus.

2. Description of the Related Art

Image pickup devices, typically, video cameras, have a function of recording the picked-up moving image of a subject as well as a function of recording a still image. In recording still images with such a video camera, the user can set the image pickup conditions such as shutter speed and aperture and the recording conditions such as resolution. On the other hand, the image pickup conditions and the recording conditions in picking up moving images are predetermined or can be changed by the user only in a relatively narrower range than in picking up still images. Therefore, still images are superior in image quality. The conventional video cameras require input of an operation for instructing the video cameras which of a moving image and a still image is to be recorded. For this purpose, the conventional video camera has a button for giving an instruction to pick up a moving image and a button for giving an instruction to pick up a still image. Some cameras have a single button for giving an instruction to pick up an image, and pick up a still image or a moving image by switching between a moving image pickup mode and a still image pickup mode. There is also known a camera that records a still image when the shutter button is pressed for a time shorter than a predetermined time, and records a moving image when the shutter button is pressed for a longer time.

However, the user may often notice that he made an operating error after he inputs an operation of giving an instruction to pick up an image. For example, if the user intended to pick up a still image but erroneously makes an operation of picking up a moving image, the user misses the shot. In addition, the recorded moving images are inferior in image quality to still images, and therefore, moving images having the same image quality as still images cannot be obtained.

SUMMARY OF THE INVENTION

In accordance with an aspect of the present invention, an image pickup apparatus includes: an image pickup portion to pick up an image of a subject and to output a still image or a moving image; an operation accepting portion to accept an operation by a user; a moving image pickup portion to, in response to the operation accepting portion accepting an operation of giving an instruction to pick up a moving image, control the image pickup portion to pick up an image under a predetermined condition for still images and thereafter to allow the image pickup portion to pick up an image under a predetermined condition for moving images; and a still image pickup portion to, in response to the operation accepting portion accepting an operation of giving an instruction to pick up a still image, control the image pickup portion to pick up an image under a predetermined condition for still images.

In accordance with another aspect of the present invention, an image pickup method is executed in an image pickup apparatus including an image pickup portion to pick up an image of a subject and to output a still image or a moving image. The method includes the steps of: accepting an operation by a user; in response to an operation of giving an instruction to pick up a moving image being accepted in the step of accepting an operation, controlling the image pickup portion to pick up an image under a predetermined condition for still images and thereafter allowing the image pickup portion to pick up an image under a predetermined condition for moving images; and in response to an operation of giving an instruction to pick up a still image being accepted in the step of accepting an operation, controlling the image pickup portion to pick up an image under a predetermined condition for still images.

In accordance with a further aspect of the present invention, an image pickup program embodied on a computer readable non-transitory medium allows a computer, which controls an image pickup apparatus including an image pickup portion to pick up an image of a subject and to output a still image or a moving image, to execute processing including the steps of: accepting an operation by a user; in response to an operation of giving an instruction to pick up a moving image being accepted in the step of accepting an operation, controlling the image pickup portion to pick up an image under a predetermined condition for still images and thereafter allowing the image pickup portion to pick up an image under a predetermined condition for moving images; and in response to an operation of giving an instruction to pick up a still image being accepted in the step of accepting an operation, controlling the image pickup portion to pick up an image under a predetermined condition for still images.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
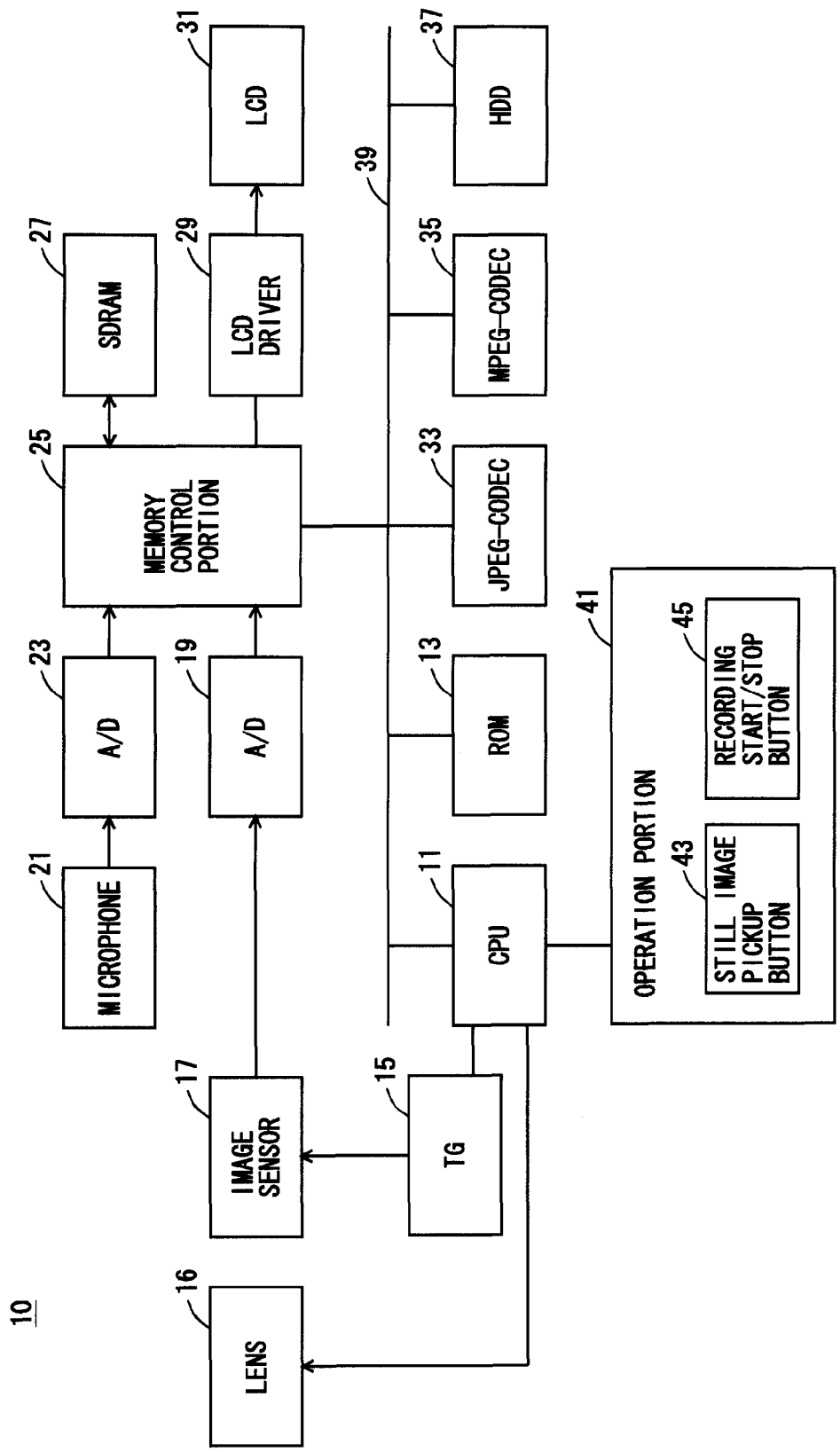
FIG. 1 is a block diagram schematically showing a configuration of a video camera in an embodiment of the present invention.

The preferred embodiment of the present invention will be described below in conjunction with the drawings. In the following description, the same or corresponding parts are denoted by the same reference characters. Their names and functions are also the same. Thus, a detailed description thereof will not be repeated.

In the present embodiment, a video camera will be described as an example of an image pickup apparatus. FIG. 1 is a block diagram schematically showing a configuration of a video camera in an embodiment of the present invention. Referring to FIG. 1, a video camera 10 includes a Central Processing Unit (CPU) 11 controlling the entire video camera 10, a ROM (Read Only Memory) 13 for storing a program executed by CPU 11, and the like, a timing generation portion (TG) 15, a lens 16, an image sensor 17, a microphone 21, an analog-to-digital conversion portions (A/D) 19, 23, a memory control portion 25, an SDRAM (Synchronous Dynamic Random Access Memory) 27, an LCD driver 29, a liquid crystal display (LCD) 31, a JPEG (Joint Photographic Experts Group)-CODEC 33, an MPEG (Moving Picture Experts Group)-CODEC 35, a hard disk drive (HDD) 37 as a mass storage device, and an operation portion 41.

CPU 11, memory control portion 25, JPEG-CODEC 33, and MPEG-CODEC 35 are each connected to a bus 39. TG 15 is controlled by CPU 11 to control an image pickup (photo-electric conversion) timing of image sensor 17. Image sensor 17 outputs to A/D 19 an image obtained by photoelectrically converting an image of a subject imaged by lens 16, in accordance with a timing input from TG 15. A/D 19 converts data of an image of an input analog signal into a digital signal for output to memory control portion 25.

Microphone 21 collects sounds and outputs audio data of an analog signal to A/D 23. A/D 23 converts audio data of an analog signal input from microphone 21 into a digital signal for output to memory control portion 25.

Memory control portion 25 stores the image input from A/D 19 into a display image area of SDRAM 23 and stores the sound input from A/D 23 into a sound area of SDRAM 23. LCD driver 29 converts data of a digital signal of an image stored in the display image area of SDRAM 23 into data of R (red), G (green), and B (blue) analog signal for output to LCD 31. As a result, an image is displayed on LCD 31.

Operation portion 41 has a plurality of buttons for accepting the user's operations, including a still image pickup button 43 and a recording start/stop button 45. When still image pickup button 43 is pressed, operation portion 41 outputs to CPU 11 a signal indicating that still image pickup button 43 is pressed. When recording start/stop button 45 is pressed, operation portion 41 outputs to CPU 11 a signal indicating that recording start/stop button 45 is pressed. Furthermore, operation portion 41 includes a touch panel superimposed on LCD 31 to accept a designated portion which is designated by the user with the finger on the display surface of LCD 31.

JPEG-CODEC 33 is controlled by CPU 11 to compress and encode image data of a digital signal stored in SDRAM 23 for conversion into encoded data in a JPEG format and to decode the encoded data in a JPEG format for conversion into image data of a digital signal.

MPEG-CODEC 35 is controlled by CPU 11 to compress and encode image data and sound data of a plurality of frames stored in SDRAM 23 in chronological order for conversion into encoded data in an MPEG format and to decode the encoded data in an MPEG format for conversion into image data and sound data. JPEG-CODEC 33 encodes or decodes an image in one frame, whereas MPEG-CODEC 35 encodes or decodes a moving image formed of images of more than one frames, and sound data.

Although HDD 37 has been described as an example of a mass storage device, HDD 37 may be replaced by a built-in flash memory or a removable optical disc (CD-ROM (Compact Disc-Read Only Memory)/MO (Magnetic Optical Disc)/MD (Mini Disc)/DVD (Digital Versatile Disc)), an IC card (including a memory card), an optical card, a mask ROM, an EPROM (Erasable Programmable ROM), an EEPROM (Electronically EPROM), or the like.

Figure 2:
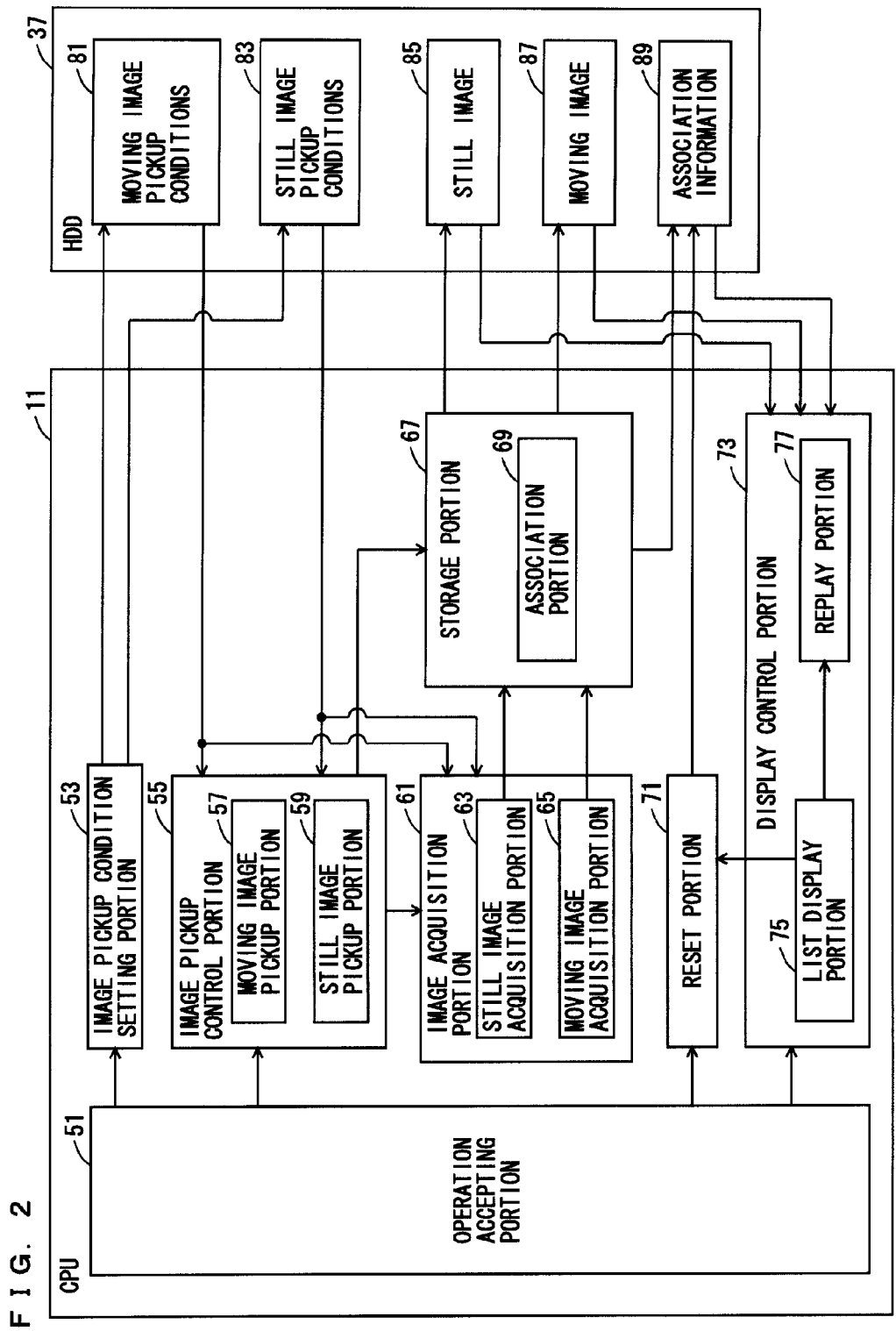
FIG. 2 is a functional block diagram showing a function overview of CPU together with images stored in HDD.

FIG. 2 is a functional block diagram showing a function overview of CPU together with data stored in HDD 37. Referring to FIG. 2, CPU 11 includes an operation accepting portion 51 for accepting an operation by the user, an image pickup condition setting portion 53 for setting image pickup conditions, an image pickup control portion 55 for controlling lens 16 and TG 15, an image acquisition portion 61 for acquiring an image output by image sensor 17, a storage portion 67 for storing the obtained image into HDD 37, a reset portion 71, and a display control portion 73 for displaying an image on LCD 31. It is noted that an image here includes a moving image and a still image.

Operation accepting portion 51 accepts an operation input by the user to operation portion 41. When the user presses still image pickup button 43, operation accepting portion 51 accepts a signal output by operation portion 41 to indicate that still image pickup button 43 is pressed. When accepting a signal indicating that still image pickup button 43 is pressed, operation accepting portion 51 outputs a still image pickup instruction to image pickup control portion 55. When the user presses recording start/stop button 45, operation accepting portion 51 accepts a signal output by operation portion 41 to indicate that recording start/stop button 45 is pressed. When accepting a signal indicating that recording start/stop button 45 is pressed, operation accepting portion 51 outputs a recording start instruction or a recording stop instruction to image pickup control portion 55. If the order in which the signal indicating that recording start/stop button 45 is pressed is accepted from operation portion 41 is an odd number, a recording start instruction is output, and if an even number, a recording stop instruction is output. In other words, one of the recording start instruction and the recording stop instruction is alternately output every time the user presses recording start/stop button 45.

Image pickup condition setting portion 53 displays a pickup condition setting screen on LCD 31. When the user inputs image pickup conditions to operation portion 41 in accordance with the pickup condition setting screen, image pickup condition setting portion 53 accepts the input image pickup conditions from operation accepting portion 51 and stores the accepted image pickup conditions in HDD 37. The image pickup conditions include moving image pickup conditions 81 for picking up a moving image and still image pickup conditions 83 for picking up a still image. Default image pickup information is stored beforehand in HDD 37. When an image pickup condition is input, image pickup condition setting portion 53 updates the default value with the input image pickup condition. Still image pickup conditions 83 include the aperture of lens 16, a shutter speed (an exposure time of image sensor 17), ISO speed, white balance, and the size of a still image to be recorded. Moving image pickup conditions 81 include the aperture of lens 16, a shutter speed, (an exposure time of image sensor 17), ISO speed, white balance, and additionally include a frame rate and a frame size. A frame refers to one of the images output by image sensor 17. It should be noted that the frame rate and the frame size of moving image pickup conditions 81 can be changed by the user's input to operation portion 41 while the other image pickup conditions are set to predetermined default values and cannot be changed by the user.

The size of a still image which is set as still image pickup conditions 83 can be selected from 2592×1944, 3680×2760, 1600×1200, 640×480, whereas the frame size set as moving image pickup conditions 81 can be selected from 640×480, 320×240, 176×144 in horizontal pixels and vertical pixels. It is noted that the size is expressed by the number of horizontal pixels to the left of the symbol x and by the number of vertical pixels to the right of the symbol x. Therefore, the size of a still image in still image pickup conditions 83 is larger in pixels than the frame size of a moving image, except when being set to 640×480, and provides better image quality.

The shutter speed set as still image pickup conditions 83 can be set in the range of $1/1000$ second to a few tens of seconds, whereas that of moving image pickup conditions 81 cannot be changed by the user and is set to a value predetermined by a frame rate. Furthermore, the aperture of the lens for picking up moving images is predetermined and is here set to a full aperture value.

The ISO speed set as still image pickup conditions 83 can be selected by the user from a plurality of predetermined choices, whereas that of moving image pickup conditions 81 cannot be changed by the user and is set to a predetermined value.

As described above, the range in which still image pickup conditions 83 can be set by the user is wider than that of moving image pickup conditions 81, so that the user can set the still image pickup conditions depending on a subject to be picked up, or considering the finished quality of a still image. Therefore, a still image is better in image quality than a moving image, and even when the images of the same subject are picked up in the same environments, the resulting still images are different if still image pickup conditions 83 are different. The user thus can record different kinds of still images by setting still image pickup conditions 83.

Image pickup control portion 55 includes a moving image pickup portion 57 for controlling picking up moving images and a still image pickup portion 59 for controlling picking up still images. When a still image pickup instruction is input from operation accepting portion 51, image pickup control portion 55 enables still image pickup portion 59 to allow image sensor 17 to output a still image. When a recording start instruction is input from operation accepting portion 55, image pickup control portion 55 first enables still image pickup portion 59 to allow image sensor 17 to output a still image and thereafter enables moving image pickup portion 57 to allow image sensor 17 to output a moving image until a recording stop instruction is input from operation accepting portion 51. When a recording start instruction is input from operation accepting portion 51, an association instruction is also output to storage portion 67.

Moving image pickup portion 57 reads out moving image pickup conditions 81 stored in HDD 37 to control lens 16 and TG 15 and to allow image sensor 17 to perform photoelectric conversion in accordance with moving image pickup conditions 81, and outputs a moving image acquisition instruction to image acquisition portion 61. Accordingly, lens 16 is controlled by the aperture defined by moving image pickup conditions 81, and image sensor 17 performs photoelectric conversion at the shutter speed defined by moving image pickup conditions 81 and outputs images of a plurality of successive frames at intervals defined by the frame rate defined by moving image pickup conditions 81.

Still image pickup portion 59 reads out still image pickup conditions 83 stored in HDD 37 to control lens 16 and TG 15 and to allow image sensor 17 to perform photoelectric conversion in accordance with still image pickup conditions 83, and outputs a still image acquisition instruction to image acquisition portion 61. Accordingly, lens 16 is controlled by the aperture defined by still image pickup conditions 83, and image sensor 17 performs photoelectric conversion at the shutter speed defined by the still image pickup conditions and outputs data of one still image.

Image acquisition portion 61 includes a still image acquisition portion 63 and a moving image acquisition portion 65. When a still image acquisition instruction is input from image pickup control portion 55, still image acquisition portion 63 acquires a still image output by image sensor 17. Still image acquisition portion 63 then reads out still image pickup conditions 83 stored in HDD 37 to process the acquired still image in accordance with the ISO speed, white balance and size of still image pickup conditions 83. Still image acquisition portion 63 then controls JPEG-CODEC 33 to encode the processed still image for output to storage portion 67. Storage portion 67 controls memory control portion 25 to store the encoded data of the compressed and encoded still image into HDD 37 with a file name. As a result, a still image 85 is stored in HDD 37.

When a moving image acquisition instruction is input from image pickup control portion 55, moving image acquisition portion 65 acquires the frames successively output by image sensor 17 in order. Moving image acquisition portion 65 then reads out moving image pickup conditions 81 stored in HDD 37 to process each of the acquired successive frames in accordance with the ISO speed, white balance and size of moving image pickup conditions 81. Moving image acquisition portion 65 then controls MPEG-CODEC 35 to encode a plurality of frames having processed images for output to storage portion 67. When encoded data of the moving image is input, storage portion 67 controls memory control portion 25 to store the encoded data of the compressed and encoded moving image into HDD 37 with a file name. As a result, a moving image 87 is stored in HDD 37.

Storage portion 67 includes an association portion 69. Association portion 69 receives an association instruction from image pickup control portion 55. An association instruction is input when image pickup control portion 55 receives a recording start instruction from operation accepting portion 51. Therefore, after a still image is input from still image acquisition portion 63, a moving image is input. Association portion 69 generates association information for associating still image 85 and moving image 87 stored in HDD 37 with each other and stores the same into HDD 37. As a result, association information 89 is stored in HDD 37. Association information 89 includes the file name of still image 85 and the file name of moving image 87. Still image 85 and moving image 87, both of which are picked up by one operation of giving an instruction to pick up a moving image by the user, are associated with each other, so that individual processes on those images, such as display or deletion, can be executed in association with each other, thereby facilitating management.

Display control portion 73 includes a list display portion 75 and a replay portion 77. List display portion 75 displays a list in which identification information are arranged for identifying still image 85 and/or moving image 87 stored in HDD 37. Here, the identification information of still image 85 is an image (hereinafter referred to as "thumbnail") produced by reducing still image 85 to a prescribed size, and the identification information of moving image 87 is a thumbnail of a prescribed frame of moving image 87. The prescribed frame is an initial frame. It is noted that a frame that satisfies a predetermined condition may be extracted from a plurality of frames. The thumbnail is identification information for identifying still image 85 or moving image 87 and is given a file name which is different from the file name of the corresponding still image 85 or moving image 87 only in extension. Therefore, the file name of the thumbnail is also identification information for identifying the corresponding still image 85 or moving image 87.

When the user inputs a list display operation to operation portion 41, list display portion 75 accepts a list display instruction from operation accepting portion 51. When the list display instruction is accepted, list display portion 75 generates a list display screen in which the thumbnails of still images 85 and/or moving images 87 are arranged, and controls LCD driver 29 to display the list display screen on LCD 31. The list display screen is a screen for the user to select one of still images 85 and moving images 87 stored in HDD 37. Here, the list display screen is set as a screen for selecting still image 85 and moving image 87.

In arranging the thumbnail of moving image 87 in the list display screen, list display portion 75 searches for association information 89 including the file name of moving image 87. If association information 89 is extracted, list display portion 75 determines that moving image 87 is associated with still image 85, and arranges in the list display screen the thumbnail of still image 85 associated with moving image 87 by association information 89, in place of the thumbnail of moving image 87. In addition, list display portion 75 arranges a mark indicating a still image and a mark indicating that moving image 87 is associated therewith, in the vicinity of the thumbnail of still image 85. The mark indicating a still image is, for example, an image of a camera, and the mark indicating that moving image 87 is associated is, for example, an image of a video camera.

On the other hand, if association information 89 is not extracted, list display portion 75 arranges the thumbnail of moving image 87 (the thumbnail of a prescribed frame of moving image 87). In this case, list display portion 75 arranges a mark indicating a moving image, in the vicinity of the thumbnail of still image 85. The mark indicating a moving image is, for example, an image of a video camera. It is noted that the mark indicating that moving image 87 is associated and the mark indicating a moving image are here the same image of a video camera, but may be different images.

In arranging the thumbnail of still image 85 in the list display screen, list display portion 75 searches for association information 89 including the file name of still image 85. If association information 89 is not extracted, list display portion 75 determines that still image 85 is not associated with moving image 87, and arranges the thumbnail of still image 85 in the list display screen. Furthermore, list display portion 75 arranges a mark indicating a still image in the vicinity of the thumbnail of still image 85.

On the other hand, in arranging the thumbnail of still image 85 in the list display screen, if association information 89 is extracted, list display portion 75 determines that still image 85 is associated with moving image 87, and does not arrange the thumbnail of still image 85 in the list display screen.

The list display screen generated by list display portion 75 has the thumbnail of a still image arranged in place of the thumbnail of a moving image, if the moving image is associated with the still image, so that the display area can be used effectively as compared with when the thumbnail of a moving image and the thumbnail of a still image are arranged. Moreover, a moving image and a still image can be selected by one operation.

In a case where the list display screen is set as a screen for selecting still image 85, list display portion 75 arranges the thumbnail of still image 85 in the list display screen, for each of still images 85 stored in HDD 37. Furthermore, when association information 89 including the file name of still image 85 is searched for and then extracted, list display portion 75 arranges a mark indicating that still image 85 is associated with moving image 87, in the vicinity of the thumbnail.

In a case where the list display screen is set as a screen for selecting moving image 87, list display portion 75 searches for association information 89 including the file name of moving image 87, for each of moving images 87 stored in HDD 37, and if association information 89 is extracted, arranges the thumbnail of still image 85 associated with moving image 87 by association information 89, and if association information 89 is not extracted, arranges the thumbnail of moving image 87. In this case, when the thumbnail of still image 85 associated with moving image 87 is arranged in the list display screen, list display portion 75 displays a mark indicating that still image 85 is associated therewith, in the vicinity of the thumbnail. The mark indicating that still image 85 is associated is, for example, an image representing a camera.

Figure 3:
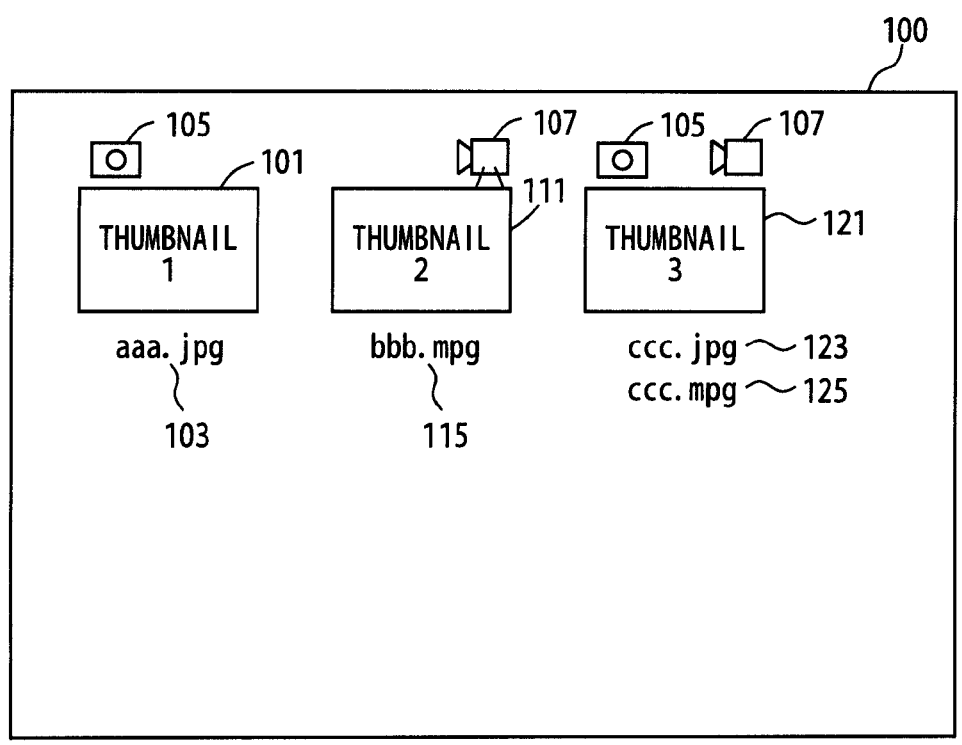
FIG. 3 is a diagram showing an exemplary list display screen.

FIG. 3 is a diagram showing an exemplary list display screen. Referring to FIG. 3, a list display screen 100 includes thumbnails 101, 111, 121. Here, thumbnails 101, 111, 121 are represented by characters "thumbnail 1" . . . "thumbnail 3", respectively, for the sake of illustration. However, they are actually displayed as images. In a field 103 below thumbnail 101, a file name "aaa.jpg" is displayed as the file name of the still image specified by that thumbnail. In a field 115 below thumbnail 111, a file name "bbb.mpg" is displayed as the file name of the moving image specified by that thumbnail. In a field 123 below thumbnail 121, a file name "ccc.jpg" is displayed as the file name of the still image specified by that thumbnail. In a field 125 below field 123, a file name "ccc.mpg" is displayed as the file name of the moving image associated with the file name "ccc.jpg."

To the upper left of thumbnail 101, a camera graphic 105 is displayed to indicate that thumbnail 101 is identification information that specifies a still image. To the upper right of thumbnail 111, a video camera graphic 107 is displayed to indicate that thumbnail 111 is identification information that specifies a moving image. To the upper left of thumbnail 121, camera graphic 105 is displayed, and to the upper right of thumbnail 121, video camera graphic 107 is displayed, indicating that thumbnail 121 is identification information for specifying a still image and that the still image is associated with a moving image.

Returning to FIG. 2, when the user inputs to operation portion 41 an operation of selecting any one of the thumbnails included in the list display screen appearing on LCD 31, list display portion 75 obtains from operation accepting portion 51 the location of the designated thumbnail in the list display screen. List display portion 75 specifies the designated thumbnail based on the obtained location and outputs the file name of still image 85 or moving image 87 specified by the thumbnail to replay portion 77 and reset portion 71.

If the user selects one thumbnail and thereafter inputs to operation portion 41 an operation of giving an instruction for replay in a state in which the list display screen appears on LCD 31, replay portion 77 accepts a replay instruction from operation accepting portion 51. When the replay instruction is accepted, replay portion 77 replays still image 85 or moving image 87 having the file name input from list display portion 75. If the file name input from list display portion 75 represents still image 85, replay portion 77 searches for association information 89 including the file name of still image 85. If association information 89 is not extracted, replay portion 77 replays still image 85. If association information 89 is extracted, replay portion 77 replays still image 85 for a prescribed time and then replays moving image 87 specified by the file name of the moving image included in the extracted association information 89. If the file name input from list display portion 75 represents moving image 87, replay portion 77 replays that moving image 87. If still image 85 is associated with moving image 87 by association information 89, replay portion 77 replays still image 85 for a prescribed time and then replays moving image 87 associated with that still image 85 by association information 89, so that the still image and the moving image associated with each other can be displayed by one operation of giving an instruction for replay, thereby simplifying the operations.

In replaying still image 85, replay portion 77 controls JPEG-CODEC 33 to decode still image 85 and controls LCD driver 29 to display the decoded still image 85 on LCD 31. In replaying moving image 87, replay portion 77 controls MPEG-CODEC 35 to decode moving image 87 and controls LCD driver 29 to display the decoded moving image 87 on LCD 31.

If the user selects one thumbnail and thereafter inputs to operation portion 41 an operation of deletion in a state in which the list display screen appears on LCD 31, reset portion 71 accepts a deletion instruction from operation accepting portion 51. When the deletion instruction is accepted, reset portion 71 deletes association information 89, if any, including the file name input from list display portion 75, on condition that the user's instruction is given. Specifically, if association information 89 including the file name input from list display portion 75 does not exist, reset portion 71 deletes still image 85 or moving image 87 specified by that file name from HDD 37. If association information 89 including the file name input from list display portion 75 exists, reset portion 71 controls LCD driver 29 to display on LCD 31 a confirmation screen for confirming that the association will be reset. Then, when the user inputs a reset operation to operation portion 41, reset portion 71 accepts a reset instruction from operation accepting portion 51. When the reset instruction is accepted, reset portion 71 deletes from HDD 37 association information 89 including the file name input from list display portion 75. When association information 89 is deleted by reset portion 71, individual processes such as deletion can be executed independently on still image 85 and moving image 87 which have been associated by association information 89.

After deleting the association information, reset portion 71 controls LCD driver 29 to display on LCD 31 a selection screen for asking which of the still image and the moving image will be deleted. Then, when the user inputs to operation portion 41 an operation of selecting the moving image or the still image, reset portion 71 accepts a selection instruction from operation accepting portion 51. If a selection instruction indicating that the moving image is selected is accepted, reset portion 71 deletes moving image 87 from HDD 37. If a selection instruction indicating that the still image is selected is accepted, reset portion 71 deletes still image 85 from HDD 37.

Figure 4:
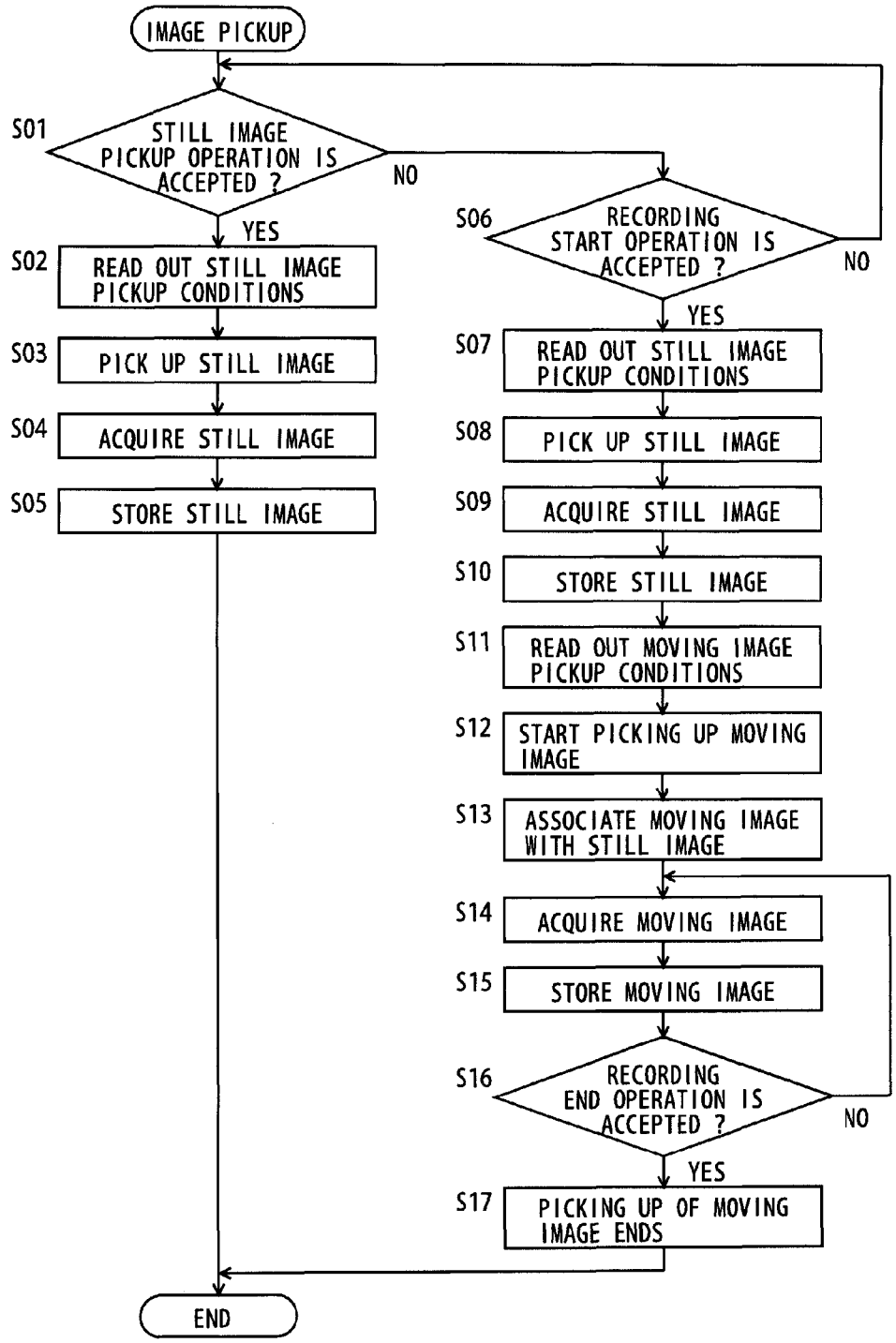
FIG. 4 is a flowchart showing an exemplary flow of an image pickup process.

FIG. 4 is a flowchart showing an exemplary flow of an image pickup process. The image pickup process is a process executed by CPU 11 when CPU 11 executes an image pickup program stored in ROM 13. Referring to FIG. 3, CPU 11 determines whether an operation of picking up a still image is accepted or not (step S01). Specifically, it is determined whether still image pickup button 43 is pressed or not. If still image pickup button 43 is pressed, the process proceeds to step S02. If not, the process proceeds to step S06. In step S02, still image pickup conditions 83 stored in HDD 37 are read out. Then, lens 16 and TG 15 are controlled in accordance with still image pickup conditions 83 to pick up a still image (step S03). Then, the still image output by image sensor 17 is acquired (step S04), and the acquired still image is stored in HDD 37 (step S05). The process then ends.

In step S06, it is determined whether a recording start instruction for starting picking up a moving image is accepted or not. Specifically, it is determined whether recording start/stop button 45 is pressed or not. If recording start/stop button 45 is pressed, the process proceeds to step S07. If not, the process returns to step S01.

Step S07-step S10 are identical with step S02-step S05. Therefore, the description thereof will not be repeated here. In step S11, moving image pickup conditions 81 stored in HDD 37 are read out. Then, lens 16 and TG 15 are controlled in accordance with moving image pickup conditions 81 to start picking up a moving image (step S12). Then, the moving image is associated with the still image stored in HDD 37 in step S10 (step S13). Specifically, the file name, which is given to the moving image when the moving image is stored in HDD 37 in step S15 as described below, is determined at this stage, and the association information including the determined file name of the moving image and the file name of the still image stored in HDD 37 in step S10 is generated and stored in HDD 37. Here, the file name of the moving image and the file name of the still image may be associated with each other by creating the same file name only different in extension, without generating association information.

In step S14, the moving image output by image sensor 17 is acquired. Then, the acquired moving image is stored in HDD 37 with the file name given in step S13.

In the next step S16, it is determined whether a recording end operation to end picking up the moving image is accepted or not. Specifically, it is determined whether recording start/stop button 45 is pressed or not. If recording start/stop button 45 is pressed, the process proceeds to step S17. If not, the process returns to step S14 and keeps recording the moving image.

Figure 5:
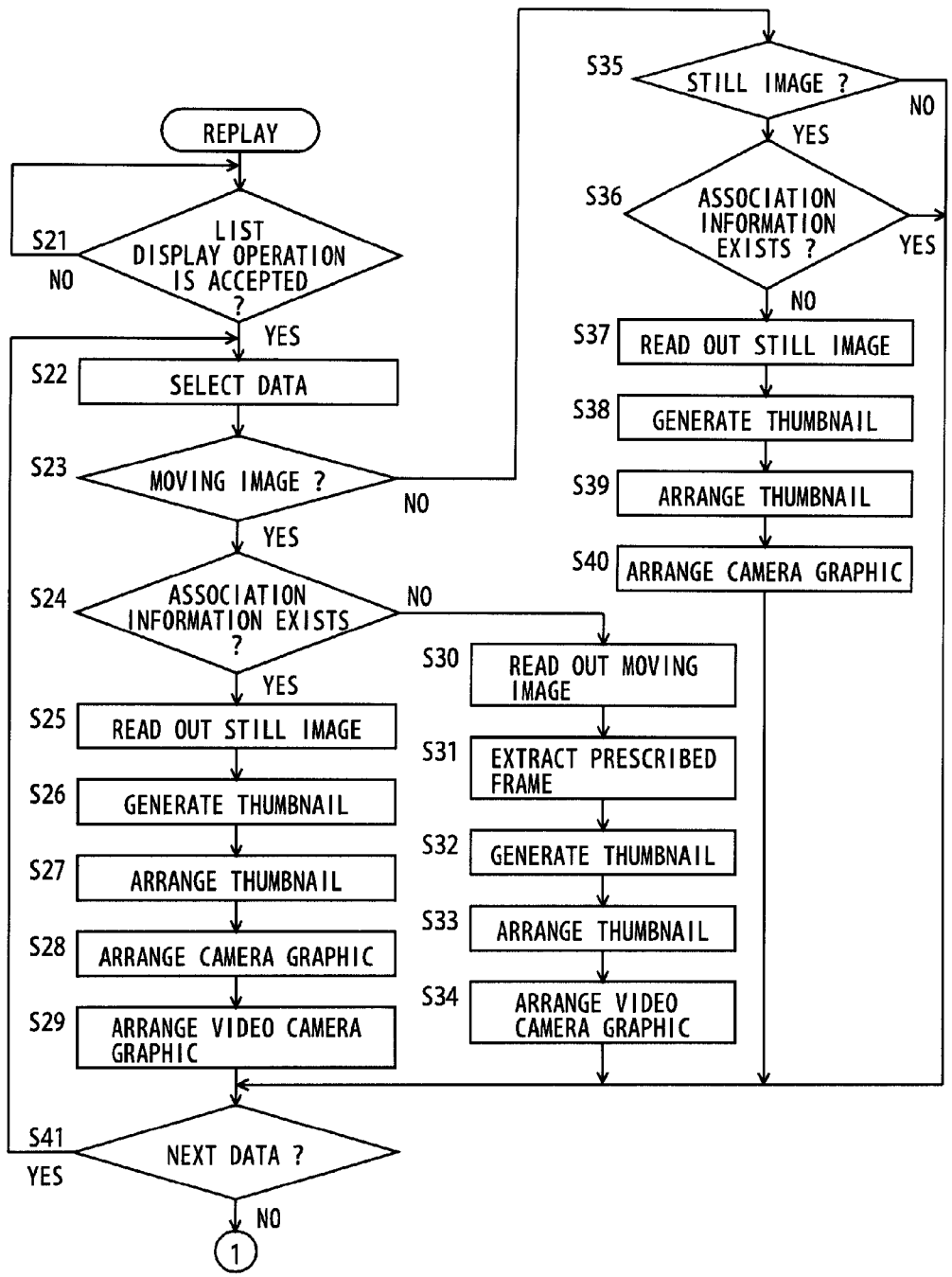
FIG. 5 is a first flowchart showing an exemplary flow of a replay process.
Figure 6:
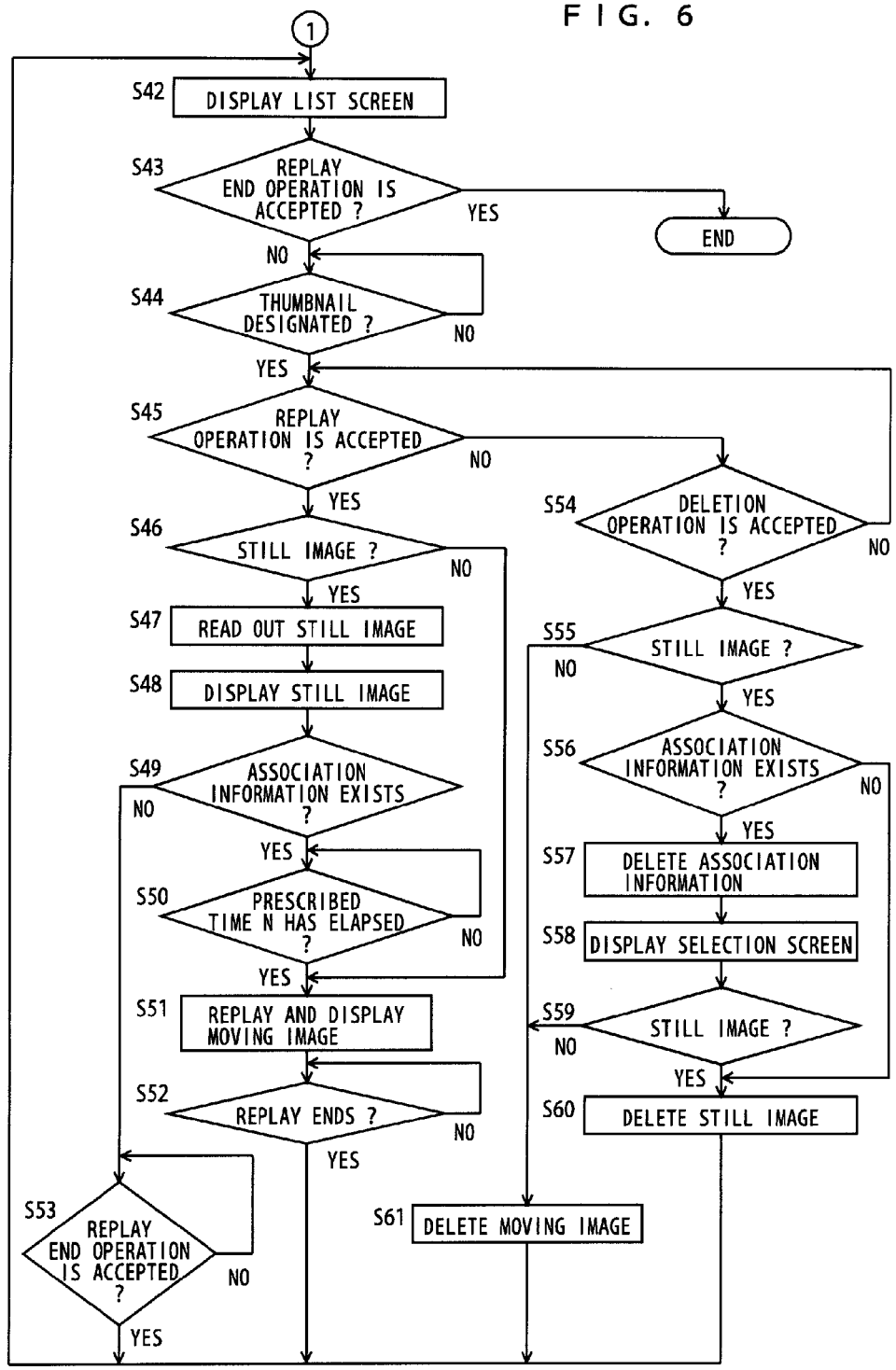
FIG. 6 is a second flowchart showing an exemplary flow of a replay process.

In step S17, the picking up of moving image is ended by terminating the control over lens 16 and TG 15, and the process then ends FIG. 5 and FIG. 6 are flowcharts showing an exemplary flow of a replay process. The replay process is a process executed by CPU 11 when CPU 11 executes an image pickup program stored in ROM 13. Referring to FIG. 5 and FIG. 6, CPU 11 determines whether a list display operation is accepted or not (step S21). When the user inputs to operation portion 41 an operation for displaying a list display screen, the list display operation is accepted. The process waits until the list display operation is accepted (NO in step S21). If the list display operation is accepted, the process proceeds to step S22.

In step S22, data stored in HDD 37 is selected. The data includes still image 85 and moving image 87. Then, it is determined whether the selected data is a moving image or not (step S23). If it is a moving image, the process proceeds to step S24, and if not, the process proceeds to step S35.

In step S24, it is determined whether the association information including the file name of the moving image selected in step S22 is stored in HDD 37 or not. If such association information is stored in HDD 37, the process proceeds to step S25. If not, the process proceeds to step S30. In step S25, the still image specified by the file name of the still image included in the association information including the file name of the moving image selected in step S22 is read from HDD 37. Then, the thumbnail of the read still image is generated (step S26). Then, the generated thumbnail is arranged in the list display screen (step S27). Then, a camera graphic is arranged in the vicinity of the thumbnail (step S28), and a video camera graphic is arranged in the vicinity of the thumbnail (step S29). The process then proceeds to step S41.

The process proceeds to step S30 in a case where the moving image is read out and the association information including the file name of the moving image is not stored in HDD 37. In this case, the moving image is read from HDD 37 (step S30), and a prescribed frame is extracted from the read moving image (step S31). Here, the first frame is extracted. Then, the thumbnail of the extracted frame is generated (step S32), and the generated thumbnail is arranged in the list display screen (step S33). Then, a video camera graphic is arranged in the vicinity of the thumbnail (step S34). The process then proceeds to step S41.

On the other hand, in step S35, it is determined whether the data selected in step S22 is a still image or not. If it is a still image, the process proceeds to step S36. If not, the process proceeds to step S41.

In step S36, it is determined whether the association information including the file name of the still image selected in step S22 is stored in HDD 37 or not. If such association information is stored in HDD 37, the process proceeds to step S41. If not, the process proceeds to step S37. If the association information including the file name of the still image is stored in HDD 37, the thumbnail of the still image is arranged in the list display screen in step S25-step S27. Therefore this step prevents display of more than one thumbnail for the same still image.

The process in step S37-step S40 is identical to the process in step S25-step S28. Therefore, a description thereof will not be repeated here. In step S40, a camera graphic is arranged in the vicinity of the thumbnail, and the process thereafter proceeds to step S41.

In step S41, it is determined whether the next data is stored in HDD 37 or not. If unprocessed data to be processed is stored, the process returns to step S22. If not, the process proceeds to step S42.

In step S42, the list display screen is displayed on LCD 31. Then, it is determined whether a replay end operation is accepted or not (step S43). When the user designates a button allocated beforehand for a replay end operation among a plurality of buttons of operation portion 41, the replay end operation is accepted from operation portion 41. If the replay end operation is accepted, the process ends. If not, the process proceeds to step S44. In step S44, it is determined whether an operation of designating a thumbnail is accepted or not. The process waits until a thumbnail is designated (NO in step S44). If a thumbnail is designated (YES in step S44), the process proceeds to step S45.

In step S45, it is determined whether a replay operation is accepted or not. If a replay operation is accepted, the process proceeds to step S46. If not, the process proceeds to step S54. In step S46, data specified by the thumbnail designated in step S44 is a still image or not. If it is a still image, the process proceeds to step S47, and if not, the process proceeds to step S51.

In step S47, the still image specified by the thumbnail designated in step S44 is read out from HDD 37. Then, the read still image is displayed on LCD 31 for a prescribed time (step S48), and the process proceeds to step S49.

In step S49, it is determined whether there exists association information including the file name of the still image specified by the thumbnail designated in step S44. If such association information exists, that association information is read out, and the process proceeds to step S50. If not, the process proceeds to step S53. In step S53, it is determined whether a replay end operation is accepted or not. The process waits until a replay end operation is accepted (NO in step S53). When a replay end operation is accepted (YES in step S53), the process returns to step S42.

In step S50, the process waits until a prescribed time N has elapsed since the still image is displayed in step S48 (NO in step S50). If a prescribed time N has elapsed (YES in step S50), the process proceeds to step S51. A prescribed time is set to one second, here. It is noted that a prescribed time N is not limited thereto and can be set to any value. In step S51, the moving image specified by the file name of the moving image included in the association information read out in step S49 is replayed and displayed. Then, the process waits until the replay ends (NO in step S52). If the replay ends (YES in step S52), the process returns to step S42.

In the case where a thumbnail is designated and a replay instruction is input, if a moving image is associated with the still image specified by the thumbnail, the moving image is replayed after the still image is displayed for a prescribed time. Therefore, the user can first view a sharp image and thereafter view the moving image that follows.

On the other hand, in step S54, it is determined whether an operation of deleting data is accepted or not. If an operation of deleting data is accepted, the process proceeds to step S55. If not, the process returns to step S45. In step S55, the data specified by the thumbnail designated in step S44 is a still image or not. If it is a still image, the process proceeds to step S56. If not, the process proceeds to step S61. In step S61, the moving image specified by the thumbnail designated in step S44 is deleted from HDD 37, and the process returns to step S42.

In step S56, it is determined whether there exists association information including the file name of the still image specified by the thumbnail designated in step S44. If such association information exists, that association information is read out, and the process proceeds to step S57. If not, the process proceeds to step S60.

In step S57, the read association information is deleted from HDD 37, and the process proceeds to step S58. Accordingly, the association between moving image and still image is cleared, so that the data become independent of each other.

In step S58, a selection screen for selecting one of the moving image and the still image is displayed on LCD 31, and the process proceeds to step S59. In step S59, it is determined which of the moving image and the still image is selected. If the still image is selected, the process proceeds to step S60. Otherwise, if the moving image is selected, the process proceeds to step S61.

In step S60, the still image specified by the association information read out in step S56 is deleted from HDD 37, and the process returns to step S42. In step S60, the moving image specified by the association information read out in step S56 is deleted, and the process returns to step S42.

As described above, when recording start/stop button 45 allocated for an operation for giving an instruction to pick up a moving image is pressed, video camera 10 in the present embodiment picks up a still image and thereafter picks up a moving image. When still image pickup button 43 allocated for an operation for giving an instruction to pick up a still image is pressed, video camera 10 picks up a still image. Even when the user intended to press the still image pickup button but erroneously pressed the recording start/stop button, a still image is picked up at the moment when the recording start/stop button is pressed. This avoids the user from missing the timing to pick up a still image due to an operating error.

Furthermore, the still image and the moving image picked up in response to the user pressing recording start/stop button 45 allocated for the operation for giving an instruction to pick up a moving image are associated with each other by association information 89, so that it becomes easier to manage the still image and the moving image both of which are picked up by one operation.

In display of the thumbnails for identifying still image 85 and moving image 87, if the moving image is associated with the still image, the identification information of still image 85 associated with the moving image is displayed in place of the thumbnail of moving image 87. Since the thumbnail of still image 85 is displayed, of moving image 87 and still image 85 associated with each other, the display area of the list display screen can be used efficiently. Moreover, moving image 87 and still image 85 can be selected by one operation.

A video camera icon is displayed as a mark indicating that a moving image is associated, together with the thumbnail of still image 85, on the list display screen, so that the user can be notified that still image 85 is associated with moving image 87.

In addition, when an operation of designating a thumbnail is accepted on the list display screen, if the still image specified by the designated thumbnail is associated with a moving image, the moving image associated with the still image is displayed after the still image is displayed. Therefore, the still image and the moving image associated with each other are displayed by one operation, thereby facilitating the operation.

Moreover, the association between a still image and a moving image is reset by deleting the association information which associates the still image and the moving image with each other, so that an individual process such as display or deletion can be executed independently for each of the still image and the moving image.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image pickup apparatus comprising:
    an image pickup portion to pick up an image of a subject and to output a still image or a moving image;
    an operation accepting portion to accept an operation by a user;
    a moving image pickup portion to, in response to said operation accepting portion accepting an operation of giving an instruction to pick up a moving image, control said image pickup portion to pick up an image under a predetermined condition for still images and thereafter to allow said image pickup portion to pick up an image under a predetermined condition for moving images;
    a still image pickup portion to, in response to said operation accepting portion accepting an operation of giving an instruction to pick up a still image, control said image pickup portion to pick up an image under a predetermined condition for still images;
    an association portion to associate a still image and a moving image output by said image pickup portion with each other, if said operation accepting portion accepts an operation of picking up a moving image;
    a storage portion to store a still image or a moving image output by said image pickup portion; and
    a list display portion to display identification information for identifying a still image and/or a moving image stored in said storage portion,
    wherein if the moving image is associated with the still image, said list display portion displays the identification information of the still image associated with the moving image, in place of the identification information of the moving image.

2. The image pickup apparatus according to claim 1, wherein if a still image is associated with a moving image, said list display portion displays a mark indicating that a moving image is associated, together with the identification information of said still image.

3. The image pickup apparatus according to claim 1, further comprising a replay portion to, if said operation accepting portion accepts an operation of designating identification information displayed by said list display portion, display a still image or a moving image specified by said designated identification information,
    wherein if a still image specified by said designated identification information is associated with a moving image, said replay portion displays said moving image associated with said still image after displaying said still image.

4. The image pickup apparatus according to claim 1, further comprising a reset portion to reset association between said associated still image and moving image.

5. The image pickup apparatus according to claim 1, wherein said moving image pickup portion allows said image pickup portion to pickup an image under a predetermined condition for still images, on condition that said operation accepting portion accepts an operation of setting association between a still image and a moving image, and said moving image pickup portion allows said image pickup portion to pick up an image under a predetermined condition for moving images without allowing said image pickup portion to pick up an image under a predetermined condition for still images, if said operation accepting portion does not accept an operation of setting association between a still image and a moving image.

6. An image pickup method executed in an image pickup apparatus including an image pickup portion to pick up an image of a subject and to output a still image or a moving image, the method comprising the steps of:
    accepting an operation by a user;
    in response to an operation of giving an instruction to pick up a moving image being accepted in said step of accepting an operation, controlling said image pickup portion to pick up an image under a predetermined condition for still images and thereafter allowing said image pickup portion to pick up an image under a predetermined condition for moving images;
    in response to an operation of giving an instruction to pick up a still image being accepted in said step of accepting an operation, controlling said image pickup portion to pick up an image under a predetermined condition for still images;
    associating a still image and a moving image output by said image pickup portion with each other, if an operation of picking up a moving image is accepted in said step of accepting an operation;
    storing a still image or a moving image output by said image pickup portion; and
    displaying identification information for identifying said stored still image and/or moving image,
    wherein if the moving image is associated with the still image, said step of displaying identification information includes the step of displaying the identification information of the still image associated with the moving image, in place of the identification information of the moving image.

7. The image pickup method according to claim 6, wherein if a still image is associated with a moving image, said step of displaying identification information includes the step of displaying a mark indicating that a moving image is associated, together with identification information of said still image.

8. The image pickup method according to claim 6, further comprising the step of: if an operation of designating identification information displayed in said step of displaying identification information is accepted in said step of accepting an operation, displaying a still image or a moving image specified by said designated identification information,
wherein if a still image specified by said designated identification information is associated with a moving image, said step of displaying includes the step of displaying said moving image associated with said still image after displaying said still image.

9. The image pickup method according to claim 6, further comprising the step of resetting association between said associated still image and moving image.

10. The image pickup method according to claim 6, wherein said step of picking up an image under a predetermined condition for moving images includes the steps of:
allowing said image pickup portion to pickup an image under a predetermined condition for still images, on condition that an operation of setting association between a still image and a moving image is accepted in said step of accepting an operation, and
allowing said image pickup portion to pick up an image under a predetermined condition for moving images without allowing said image pickup portion to pick up an image under a predetermined condition for still images, if an operation of setting association between a still image and a moving image is not accepted in said step of accepting an operation.

11. An image pickup program embodied on a computer readable non-transitory medium for allowing a computer, which controls an image pickup apparatus including an image pickup portion to pick up an image of a subject and to output a still image or a moving image, to execute processing including the steps of:
accepting an operation by a user;
in response to an operation of giving an instruction to pick up a moving image being accepted in said step of accepting an operation, controlling said image pickup portion to pick up an image under a predetermined condition for still images and thereafter allowing said image pickup portion to pick up an image under a predetermined condition for moving images;
in response to an operation of giving an instruction to pick up a still image being accepted in said step of accepting an operation, controlling said image pickup portion to pick up an image under a predetermined condition for still images;
associating a still image and a moving image output by said image pickup portion with each other, if an operation of picking up a moving image is accepted in said step of accepting an operation;
storing a still image or moving image output by said image pickup portion; and
displaying identification information for identifying said stored still image and/or moving image,
wherein if the moving image is associated with the still image, said step of displaying identification information includes the step of displaying the identification information of the still image associated with the moving image, in place of the identification information of the moving image.

12. The image pickup program according to claim 11, wherein if a still image is associated with a moving image, said step of displaying identification information includes the step of displaying a mark indicating that a moving image is associated, together with identification information of said still image.

13. The image pickup program according to claim 11, wherein said image pickup program allows said computer to further execute the step of: if an operation of designating identification information displayed in said step of displaying identification information is accepted in said step of accepting an operation, displaying a still image or a moving image specified by said designated identification information,
wherein if a still image specified by said designated identification information is associated with a moving image, said step of displaying includes the step of displaying said moving image associated with said still image after displaying said still image.

14. The image pickup program according to claim 11, wherein said image pickup program allows said computer to further execute the step of resetting association between said associated still image and moving image.

* * * * *